United States Patent [19]

Grant

[11] 4,443,205

[45] Apr. 17, 1984

[54] GEAR TYPE SHAFT COUPLING

[75] Inventor: George G. Grant, Mishawaka, Ind.

[73] Assignee: Reliance Electric Co., Mishawaka, Ind.

[21] Appl. No.: 280,462

[22] Filed: Jul. 6, 1981

[51] Int. Cl.³ .............................................. F16D 3/18
[52] U.S. Cl. ...................................... 464/16; 464/156
[58] Field of Search ................ 464/16, 149, 154, 156, 464/158, 182, 159

[56] References Cited

U.S. PATENT DOCUMENTS

| | | | |
|---|---|---|---|
| 1,835,506 | 12/1931 | Linn | 464/156 X |
| 2,726,523 | 12/1955 | Zrodowski | 464/156 X |
| 2,845,781 | 8/1958 | O'Brien | 464/156 |
| 3,080,732 | 3/1963 | Crankshaw | 464/156 |
| 3,126,722 | 3/1964 | Kramer et al. | 464/159 X |
| 3,174,302 | 3/1965 | Pomper | 464/154 |
| 3,243,973 | 4/1966 | Kraeling | 464/156 |
| 3,673,814 | 7/1972 | Carman | 464/156 |
| 4,335,963 | 6/1982 | Jameson et al. | 464/156 X |

FOREIGN PATENT DOCUMENTS 667217  2/1952  United Kingdom .

OTHER PUBLICATIONS

Waldron Gear Couplings, Bulletin 712B, Nov. 1979.

Primary Examiner—John M. Jillions
Assistant Examiner—Daniel P. Stodola
Attorney, Agent, or Firm—Marmaduke A. Hobbs

[57] ABSTRACT

A gear coupling for a pair of rotatable shafts disposed in end-to-end relation, in which a pair of hubs is mounted on the shafts and sleeves are secured to the inboard side of the hubs and contain internal teeth. A spacer extends between the two sleeves and is provided with gear teeth at each end for meshing with the internal gear teeth in the sleeves. A separate plate is mounted on the inner end of each hub and an element is secured to each end of the spacer for engaging an annular shoulder inside each sleeve, for minimizing the end play of the spacer relative to the hubs and to eliminate or minimize the end play of one shaft by utilizing the stability of the other shaft to control the end play of the first shaft.

9 Claims, 4 Drawing Figures

GEAR TYPE SHAFT COUPLING

BACKGROUND OF THE INVENTION

In the mechanical power transmission field, gear-type shaft couplings have been used for many years for a wide variety of applications, including low, intermediate and high speed installations. This type of coupling is effective in adapting to misalignment between shafts in end-to-end relationship and will give optimum performance for long periods of time without substantial service other than maintaining proper lubrication between the sliding parts of the gearing in the coupling. One type of gear coupling usually used for high speed applications, consists essentially of a flange on each shaft with a spacer therebetween connected to the flange by splines; the teeth of the splines, normally being referred to as gears, are not contoured to permit substantial angular misalignment and parallel offset between the shafts, but, with the use of precision machining, they are particularly suitable for high speed operations. However, the precision machining and close tolerances enhance the production costs of the couplings. Another type of gear coupling, having gears on the periphery of the hubs meshing with internal gears of coaxial sleeves, has generally been difficult to install on the shaft initially and to service when replacement of the parts on which the gears are located is required. This often requires removal of the hubs from the shafts, reworking the shafts, and reassembling the parts of the sleeves containing the gears on the shafts before the hubs are assembled thereon. Since the hubs are often mounted onto the shafts by heating the hubs and then shrinking them onto the shafts, the preassembled gear sleeves are frequently subjected to sufficient heat to damage the seals in the sleeves. Further, if the gear sleeves require replacement, the hubs of this type of coupling must be removed before the gear sleeves can be removed and replaced, and in this servicing operation the replacement sleeves will be likely to be subjected to the heat required to secure the hubs to the shaft, thus subjecting the new sleeves to sufficient heat to damage the parts thereof, particularly the seals.

Another difficulty or problem frequently encountered in couplings used to connect shafts in an end-to-end relation, is the end play between the two shafts, or the end play of one shaft being transmitted to and causing end play in the other shaft. A related problem involves a condition in which one shaft is virtually free of end play during operation while the other shaft has a substantial amount of objectionable end play. With a number of couplings the construction is such that the axial stability of one shaft cannot be utilized to control the end play of the other. These various difficulties and problems have not, in the past, been eliminated or significantly minimized by the use of the standard or conventional gear couplings without substantial modification of the couplings.

SUMMARY OF THE INVENTION

One of the principal objects of the present invention is to provide a gear-type shaft coupling which can be assembled in operating position on two shafts in end-to-end relation by first mounting the hubs onto the shafts and then securing the gear sleeves onto the mounted hubs with the spacer disposed therebetween, thus avoiding subjecting the gear sets and associated seals to the heat used in shrink fitting the hubs to the shafts.

Another object of the invention is to provide a gear coupling of the aforesaid type which is capable of adapting to a relatively large degree of shaft misalignment, including parallel offset and angular misalignment, and which is relatively simple to fabricate, install and service and is particularly adapted for low and intermediate speed operation.

A further object of the invention is to provide a shaft coupling which is capable of eliminating or minimizing the end play of one shaft by utilizing the stability of the other shaft as well as preventing relative end play between the shafts, and which can be dynamically balanced throughout its length after it has been mounted on an arbor.

The foregoing objects, and other objects and advantages which will become apparent from the following description, are accomplished by the present invention embodied in a gear coupling consisting of a pair of hubs adapted to be mounted on a pair of shafts positioned in an end-to-end relationship, sleeves mounted on the inboard side of the hubs and having a set of internal gearing, a spacer disposed between the two sleeves and projecting thereinto and having a set of external gearing near each end for meshing with the internal gearing on the respective sleeve, and an element disposed between each end of the spacer and the respective sleeve or hub for preventing or minimizing and play or float of the spacer relative to the shafts and thereby preventing or minimizing relative end play between the shafts. Various changes and modifications may be made in the foregoing coupling structure to adapt the coupling to different types of installations and particular applications.

DESCRIPTION OF THE PREFERRED EMBODIMENT

Figure 1:
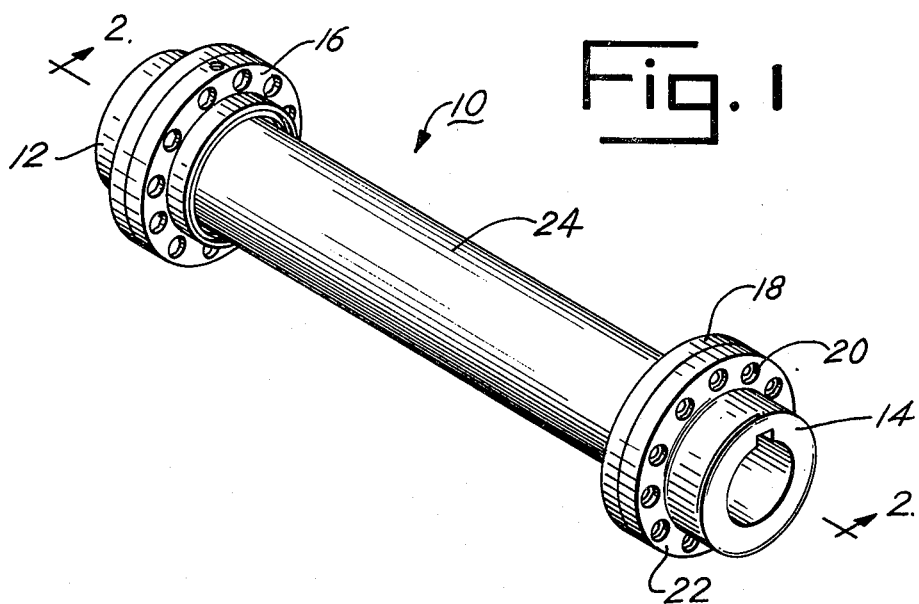
FIG. 1 is a perspective view of a gear coupling embodying the present invention, showing the coupling fully assembled but not installed on the shafts.

Referring more specifically to the drawings and to FIG. 1 in particular, numeral 10 indicates generally a gear coupling embodying the present invention and consisting generally of hubs 12 and 14, sleeves 16 and 18 secured to the respective hubs by a plurality of bolts 20 extending through holes in flange 22 of the hubs and through the sleeves. The two sleeves are interconnected by a spacer 24, the spacer 24 being hollow throughout its length and the ends of the spacer extending into the two sleeves 16 and 18. While the spacer is shown relatively long, it may be of various lengths, depending upon the requirements of a particular installation in which the coupling is used.

The hubs 12 and 14 are adapted to be mounted on the ends of the respective shafts (not shown), each having a bore 30 for slipping onto the shaft, and keyways 32 for receiving a key for securing the hubs against relative rotation with respect to the shaft. The hubs may be mounted on the shafts by various securing means; however, in the embodiment illustrated, the hubs are shrink-fitted on the shafts by initially heating the hubs to expand them and permitting them to cool and grip the ends of the respective shafts. With the conventional prior gear couplings having the sleeves mounted on the outboard side of the hubs, the sleeves can only be mounted in proper place in the coupling by mounting the sleeves before the hubs are mounted on and secured to the shafts. Since the hubs are often heated and shrink-fitted to the shaft, the sleeves, including the seals and gear teeth thereof, are often subjected to relatively high temperatures and hence are sometimes damaged during the installation of the coupling.

In the present gear coupling, the hubs are first mounted on the shaft in proper spaced relationship to one another and sleeves 16 and 18 and the spacer are inserted between the hubs and secured in place by bolts 20. The spacer is operationally connected to the two sleeves by gear teeth 33 and 34 on the external surface of the opposite ends of the spacer and by gear teeth 36 and 38 on the internal surface of the two sleeves 16 and 18. These gear teeth intermesh and the teeth on the spacer are so contoured that the spacer can effectively adjust to misalignment of the shafts on which the two hubs are mounted. Sleeves 16 and 18 are sealed to the external surface of spacer 24 by seals 40 and 42 seated in the inner ends of the two sleeves. Various types of seals may be used, and in some couplings, continuous lubrication is achieved by omitting the seals and maintaining continuous lubrication through the ends of the sleeves. The gears may be otherwise lubricated through duct 44 extending radially through the respective sleeves and being closed by a plug seated in threaded end 46. When a lubricant is forced inwardly through duct 44, it travels through the gears.

Figure 2:
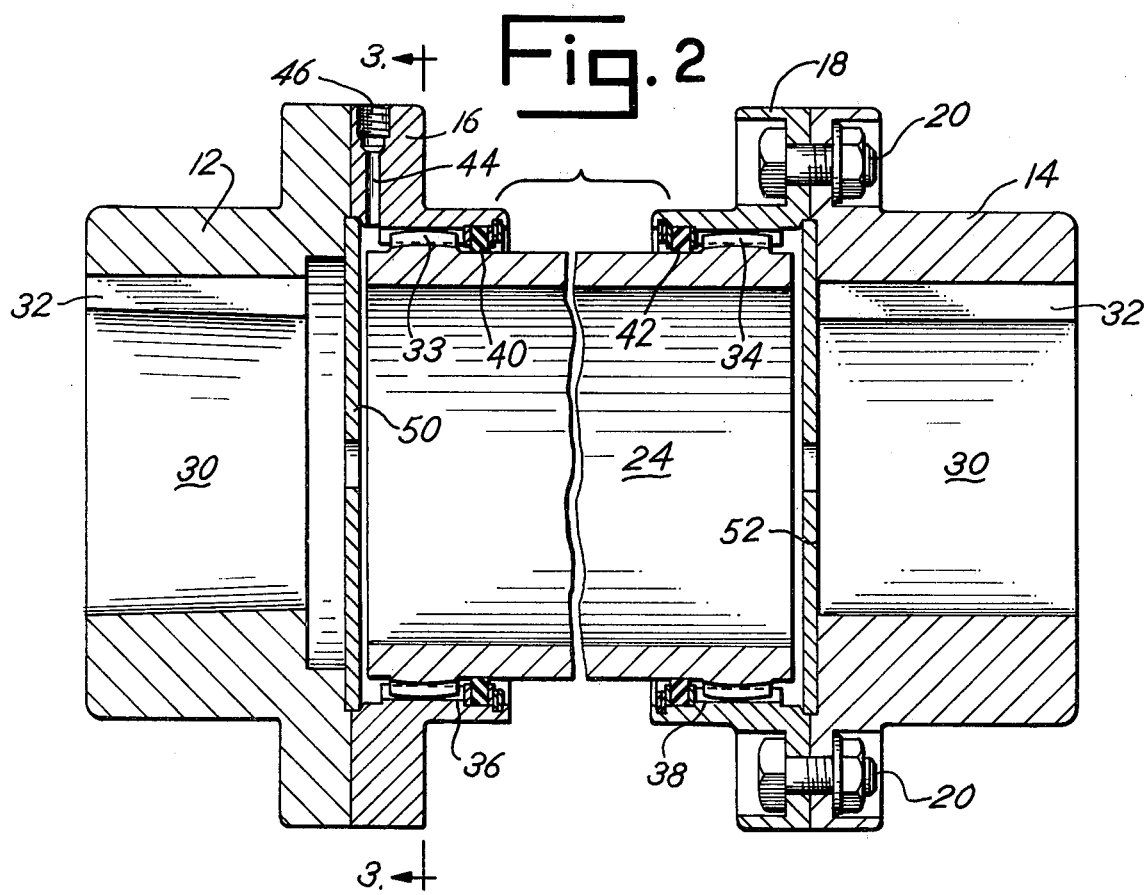
FIG. 2 is an enlarged cross sectional view of the gear coupling shown in FIG. 1, the section being taken on line 2—2 of the latter figure.
Figure 3:
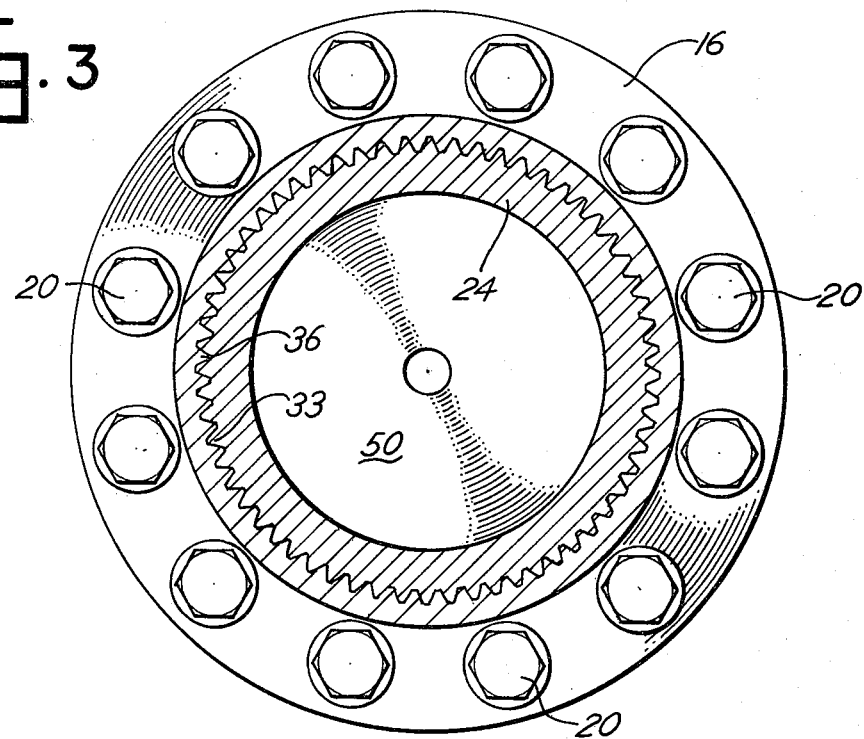
FIG. 3 is a vertical cross sectional view of the gear coupling shown in FIGS. 1 and 2, the section being taken on line 3—3 of FIG. 2.

In the embodiment of the invention illustrated in FIGS. 2 and 3, bumper plates 50 and 52 are secured between the adjacent ends of the respective hubs and sleeves when the hubs and sleeves are secured together by bolts 20. The two plates 50 and 52 restrict the movement of the spacer and assist in minimizing the end play or float between the two shafts and the spacer.

Figure 4:
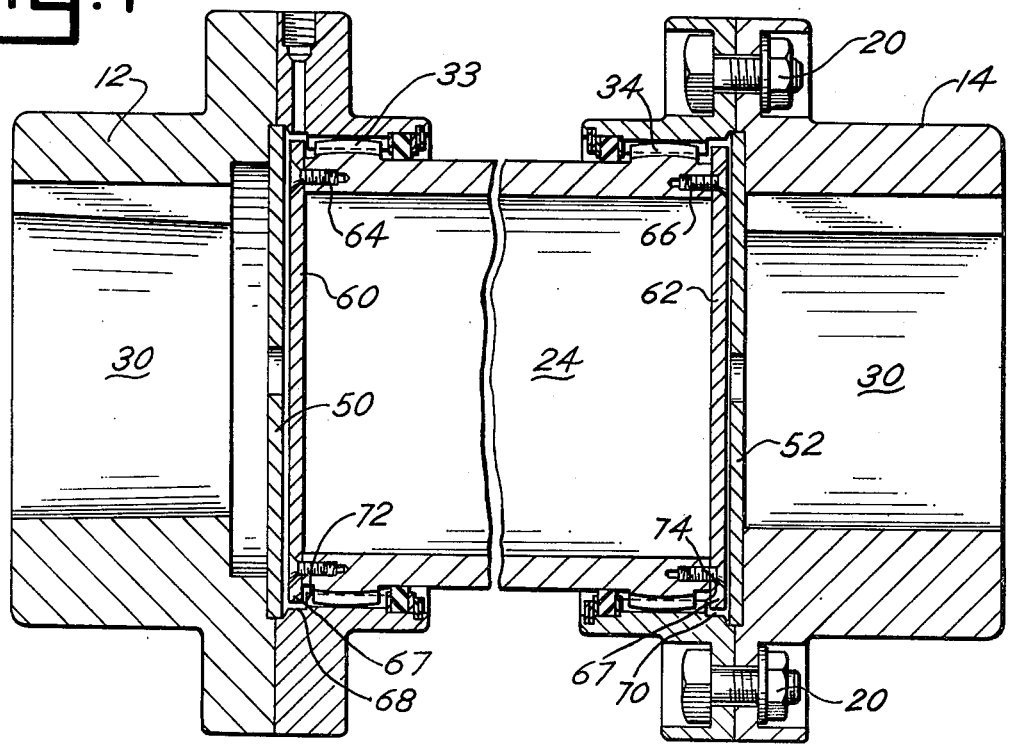
FIG. 4 is a vertical cross sectional view similar to the section of FIG. 2 but illustrating a modified form of the present gear coupling.

In the modified form of the invention illustrated in FIG. 4, most of the parts are essentially identical with those shown and described with reference to the embodiment of FIGS. 2 and 3, and hence like numerals will be used to identify like parts. In the embodiment of FIG. 4, plates 60 and 62 are secured to the opposite ends of spacer 24 by a plurality of screws 64 and 66 spaced from one another around the periphery of the plate. The plates are disc shaped and have an annular flange 67 which projects outwardly from the spacer into annular spaces 68 and 70. The teeth on the inner surface of the sleeves provide, in effect, abutments 72 and 74 which, together with plates 50 and 52, restrict the axial movement of the spacer relative to the two sleeves and the two hubs, in that any movement of one end of the spacer away from the hub is restricted by the engagement of flange 67 of plates 60 and 62 with either shoulder 72 or 74, depending upon in which direction the movement occurs. While the two plates 50 and 52 form abutments, flange 67 on plates 60 and 62 on the opposite ends of the spacer, and the respective shoulders 72 and 74, perform a further restricting function. Thus, with the arrangement of FIG. 4, if the coupling is used to connect the shaft of a motor to the shaft of a gear reducer, the end play of the motor shaft is restricted by the stable shaft of the gear reducer. Thus, destructive end play or floating of the shafts relative to one another and relative to the drive and driven equipment is eliminated or minimized to the point where the end play is inconsequential with respect to the operation and life of the coupling and equipment.

In the use and operation of the present gear coupling, the two hubs 12 and 14 are secured to the respective shafts, preferably by shrink-fitting them onto the shafts, and the two sleeves 16 and 18 are assembled on the spacer 24, and this assembly is then inserted between the two hubs, with the sleeves being secured thereto by bolts 20. A rather narrow space is provided between the ends of the spacer and plates 50 and 52 of the embodiment shown in FIGS. 2 and 3 or between plates 50 and 60 and plates 52 and 62 in the embodiment of FIG. 4. The gear teeth can effectively be lubricated before they are assembled, and the two seals 40 and 42 retain the lubricant in and around the intermeshing teeth at each end of the spacer. The end play or float is restricted in both embodiments; however, it is most effectively restricted in the embodiment illustrated in FIG. 4, by the relationship of the periphery of plates 60 and 62 to the adjacent end of the teeth 36 and 38 of the sleeve, which form annular abutments 72 and 74. In the present coupling, the gears on the spacer are disposed relatively close to the respective ends of the spacer and are preferably formed integrally therewith, thus providing effective broad limits to misalignment between the shafts on which the coupling is mounted. Further, since the hubs are mounted on shafts apart from the sleeves, the heat for expanding the hub does not have any opportunity to adversely affect the sleeves. The sleeves are mounted on the spacer and are retained thereon by the two seals 40 and 42. If replacement of the sleeves or the seals thereof is required, the sleeves can be easily removed by removing bolts 20 and then sliding the spacer and sleeves outwardly from between the hubs. The sleeves can then be slid endwise from the spacer. Since the sleeves and spacer can be fully removed, no adapter is required when the shafts of the drive or driven equipment are rotated without the complete coupling, as is normally required in the conventional gear coupling. The present coupling can be easily installed and readily serviced and parts replaced, if required, throughout the operating life of the coupling, without the use of any special tools, equipment or mechanical skill.

While only one embodiment of the present gear-type shaft coupling and a modification thereof have been described in detail herein, various changes and modifications may be made without departing from the scope of the invention.

I claim:

1. A gear coupling for connecting two shafts in end-to-end relation, comprising hubs for mounting on each of the shafts, sleeves secured to said hubs in axial alignment therewith and extending from the hubs towards one another, said sleeves having internal gear teeth, a tubular shaped spacer extending between said sleeves and having external gear teeth near the ends thereof for meshing with the gear teeth in said sleeves, means for minimizing end play between said spacer and said hubs, including a separate plate on the inner end of each of said hubs, an annular shoulder on each of said sleeves on the outboard side of the teeth of said sleeves and in close proximity to the respective hub, and a radially outwardly extending flange on each end of said spacer between the respective end plate and said annular shoulder for engaging the respective shoulder on the outboard side thereof.

2. A gear coupling for connecting two shafts in end-to-end relation as defined in claim 1 in which a seal is provided at the inner edge of said sleeves for engaging the surface of said spacer for retaining a lubricant on said gear teeth.

3. A gear coupling for connecting two shafts in end-to-end relation as defined in claim 1 in which said annular flange on said spacer consists of disc shaped plates secured to the ends of said spacer.

4. A gear coupling for connecting two shafts in end-to-end relation as defined in claim 1 in which each of said hubs has a radially extending flange on the inboard side thereof, and the respective sleeve has a radially extending flange for seating on the flange on said hub, and means extending through said hub and sleeve flanges for securing said sleeves to said hubs.

5. A gear coupling for connecting two shafts in end-to-end relation as defined in claim 3 in which said separate plate is disc shaped and is mounted on said hubs adjacent the respective sleeve.

6. A gear coupling for connecting two shafts in end-to-end relation as defined in claim 5 in which each of said hubs has a radially extending flange thereon on the inboard side thereof, and the respective sleeve has a radially extending flange for seating on the flange on said hub, and means extending through said hub and sleeve flanges for securing said sleeves to said hubs.

7. A gear coupling for connecting two shafts in end-to-end relation as defined in claim 1 in which said separate plate is disc shaped and is mounted on said hubs adjacent the respective sleeve.

8. A gear coupling for connecting two shafts in end-to-end relation as defined in claim 7 in which each of said hubs has a radially extending flange thereon on the inboard side thereof, and the respective sleeve has a radially extending flange for seating on the flange on said hub, and means extends through said hub and sleeve flanges for securing said sleeves to said hubs and thereby retaining said spacer in operative position between the hubs.

9. A gear coupling for connecting two shafts in end-to-end relation as defined in claim 8 in which a seal is provided at the inner edges of said sleeves for engaging the surface of said spacer for retaining a lubricant on said gear teeth.

* * * * *